United States Patent [19]

Tokiwa et al.

[11] Patent Number: 5,225,490
[45] Date of Patent: Jul. 6, 1993

[54] BIODISINTEGRABLE THERMOPLASTIC RESIN MOLDINGS AND A PROCESS FOR PRODUCING SAME

[75] Inventors: Yutaka Tokiwa, Tsuchiura; Akira Iwamoto; Kiyoshi Takeda, both of Tsukuba, all of Japan

[73] Assignees: Director-General of Agency of Industrial Science and Technology; JSP Corporation, both of Japan

[21] Appl. No.: 609,849

[22] Filed: Nov. 7, 1990

[30] Foreign Application Priority Data

Nov. 8, 1989 [JP] Japan .................................. 1-292040
Feb. 28, 1990 [JP] Japan .................................. 2-49798
Oct. 19, 1990 [JP] Japan .................................. 2-281317

[51] Int. Cl.$^5$ ............... C08L 67/02; C08L 67/04; C08L 77/00; C08L 77/06
[52] U.S. Cl. .................................... 525/176; 525/177; 525/186; 525/190; 525/411; 525/419; 525/425; 525/938; 264/176.1
[58] Field of Search ............... 525/186, 190, 176, 177, 525/411, 419, 425, 938; 264/176 R

[56] References Cited

U.S. PATENT DOCUMENTS

| | | | |
|---|---|---|---|
| 3,592,877 | 7/1971 | Mullins | 525/186 |
| 3,632,687 | 1/1972 | Walter et al. | 260/896 |
| 3,734,979 | 5/1973 | Koleske | 525/186 |
| 3,781,381 | 12/1973 | Koleske | 525/186 |
| 3,867,324 | 2/1975 | Clendinning | 525/186 |
| 3,919,163 | 11/1975 | Clendinning | 525/186 |
| 3,929,937 | 12/1975 | Clendinning et al. | 260/896 |
| 4,144,223 | 3/1979 | Kent | 525/186 |
| 4,393,167 | 7/1983 | Holmes | 525/64 |
| 4,661,530 | 4/1987 | Gogolewski | 521/137 |
| 5,051,476 | 9/1991 | Uji | 525/186 |

FOREIGN PATENT DOCUMENTS

| | | |
|---|---|---|
| 0226439 | 6/1987 | European Pat. Off. |
| 8400303 | 2/1984 | PCT Int'l Appl. |
| 8600533 | 1/1986 | PCT Int'l Appl. |
| 8700419 | 1/1987 | PCT Int'l Appl. |
| 2125803 | 3/1984 | United Kingdom |

Primary Examiner—Patricia A. Short
Attorney, Agent, or Firm—Lorusso & Loud

[57] ABSTRACT

Biodisintegrable thermoplastic resin moldings and a process for producing same are disclosed, the biodisintegrable thermoplastic resin moldings being comprised of a thermoplastic aliphatic polyester resin as a matrix resin having dispersed therein an other type of thermoplastic resin in a proportion of 40-75 weight % based on the whole resin. The biodisintegrable thermoplastic resin moldings is easily disintegrable after disposal in an environment where microorganisms exist so that the moldings can be reduced in bulkness and give no harmful effect on the life of natural plants and animals. Thus, the present invention affords an effective means for solving various problems in the treatment of disposed plastic articles.

3 Claims, No Drawings

BIODISINTEGRABLE THERMOPLASTIC RESIN MOLDINGS AND A PROCESS FOR PRODUCING SAME

BACKGROUND OF THE INVENTION

1. Field of the Invention

The present invention relates to biodisintegrable thermoplastic resin moldings and to a process for producing same. More particularly, the present invention relates to biodisintegrable thermoplastic resin moldings comprised of a thermoplastic aliphatic polyester as a matrix resin having another type of thermoplastic resin uniformly dispersed therein and to a process for producing the resin moldings which comprises extruding a melt-kneaded mixture of the thermoplastic aliphatic polyester resin and another type of thermoplastic resin through a die under specific conditions.

2. Description of the Prior Art

In connection with the treatment of waste goods, a movement of prohibiting or limiting the use of plastics as packaging materials is being encouraged in recent years in Europe and America. In particular, biodisintegrable plastics wherein plastics are incorporated with starch are now put into practice in U.S.A. The disintegration of plastics in this case is attained by chemical decomposition of starch in the plastics by the action of microorganisms. In case the amount of starch incorporated into the plastics is small, however, the desired disintegration will not take place. On the other hand, if the amount of starch is large, the disintegration of the plastics will certainly take place, but the incorporated starch is granular and devoid of any plasticity so that the resultant resin products such as resinous sheets are significantly inferior in mechanical properties and secondary processability, such as thermoformability (in vacuum forming, pressure forming, matched die forming, etc.) into containers or the like products, to ordinary plastics containing no starch. Further, the use of such biodisintegrable plastics is limited only for the manufacture of films or bags where a secondary processing treatment is not required so such.

Anyway, all of the known conventional biodisintegrable resins are unsatisfactory in maintaining mechanical properties inherent to the pure resin components and are hardly processed to manufacture shaped articles.

Under the above circumstances, there is a great demand for developing new type biodisintegrable plastics which enable disintegration by microorganisms and prevent deterioration in mechanical properties and thermoformability by incorporation of a substance chemically decomposable by microorganisms.

BRIEF SUMMARY OF THE INVENTION

Accordingly, it is an object of the present invention to provide biodisintegrable thermoplastic resin moldings which overcome drawbacks of the prior art biodisintegrable resins incurring problems of deterioration of mechanical strength and difficulty in secondary processing of the resins.

It is another object of the present invention to provide a biodisintegrable thermoplastic resin moldings comprised as a matrix thereof of a thermoplastic aliphatic polyester resin having dispersed therein another type of thermoplastic resin in a specific proportion.

It is still another object of the present invention to provide biodisintegrable thermoplastic resin moldings which are excellent not only in biodisintegrability but also in mechanical properties and secondary processability.

It is further object of the present invention to provided a process for producing biodisintegrable thermoplastic resin moldings which comprises extruding a melt-kneaded mixture of the thermoplastic aliphatic polyester resin and another type of thermoplastic resin through a die under specific conditions.

It is still further object of the present invention to provide the use of the biodisintegrable thermoplastic resin moldings for manufacturing shaped articles therefrom by secondary processing.

Other and further objects, features and advantages of the present invention will be apparent more fully from the following description.

As a result of extensive research made by the present inventors to develop new type biodisintegrable thermoplastic resin which overcomes many drawbacks as seen in the prior art similar resins, it has now been found that moldings derived from a mixture of a thermoplastic aliphatic polyester resin as a matrix and another type thermoplastic resin as dispersant in a specific proportion exhibit excellent biodisintegrability without damaging the inherent excellent mechanical properties and secondary processability. The present invention has been accomplished on the basis of the above finding.

DETAILED DESCRIPTION OF THE INVENTION

In accordance with the present invention, there is provided biodisintegrable thermoplastic resin moldings which comprises an aliphatic polyester resin as matrix resin having uniformly dispersed therein another type of thermoplastic resin in a proportion of 40–75 weight % based on the whole resin.

In accordance with the present invention, there is also provided a process for producing biodisintegrable thermoplastic resin moldings which comprises extruding a melt-kneaded mixture of 25–60 weight % of an aliphatic polyester resin and 75–40 weight % of another type of thermoplastic resin through a die positioned at the front end of the extruder under the condition satisfying the following expressions:

$$10 > \eta_B/\eta_A \geq 1, \text{ preferably } 5 > \eta_B/\eta_A \geq 1 \qquad (I)$$

$$\eta_A \geq 500 \qquad (II)$$

wherein $\eta_A$ stands for the viscosity in terms of poise of the aliphatic polyester resin at the extrusion temperature, and $\eta_B$ stands for the viscosity in terms of poise of the another type of thermoplastic resin at the extrusion temperature.

It is one of the gists of the present invention that the moldings comprises as a matrix thereof a thermoplastic polyester resin and another type of thermoplastic resin in a specific proportion as a dispersant thereof.

It is another gist of the present invention that a melt-kneaded mixture of both resins is extruded through a die under the condition satisfying the above expressions (I) and (II).

The thermoplastic aliphatic polyester resin (referred to hereinafter simply as Resin A) used in the present invention as matrix resin is known and commercially available. Illustrative of Resin A are, for example, a polycondensate of an aliphatic polycarboxylic acid including dicarboxylic acid with an aliphatic polyhydric alcohol including a diol, a polycondensate of an aliphatic hydroxycarboxylic acid, and a ring-opened polycondensate of a lactone. These polymers are all biodegradable and are capable of being hydrolyzed by the action of lipase contained in microorganisms. Specific example of Resin A include homopolymers or copolymers derived from ethylene adipate, propiolactone, caprolactone and β-hydroxybutyric acid. Unlike starch, these aliphatic polyester resins are thermoplastic but fail to possess such physical properties as to make the resins alone utilizable for moldings such as a sheet or film.

Another type of the thermoplastic resin (referred to hereinafter simply as Resin B) includes various known resins conventionally used for the manufacture of moldings. Examples of Resin B are homopolymers and copolymers derived from olefins, styrenes, vinyl compounds, acrylic compounds, lactams, and a combination of polycarboxylic acids and polyamines. Illustrative of the polymers derived from olefins are, for example, high density, medium density and low density polyethylene, polypropylene, polybutene, ethylene-propylene copolymer, propylene-butene copolymer, ethylene-vinyl acetate copolymer, etc. Illustrative of the polymers derived from styrenes are, for example, polymers or copolymers derived from styrene, methylstyrene and similar nucleus-substituted homologs. Illustrative of the polymers derived from vinyl compounds are, for example, polyvinyl chloride, polyvinylidene chloride and polyvinyl alcohol. Illustrative of the polymers derived from acrylic compounds are, for example, poly(methyl methacrylate), methyl methacrylate-styrene copolymer, methyl methacrylate-α-methylstyrene copolymer, etc. Illustrative of the polymers derived from lactams and a combination of polycarboxylic acids and polyamines are, for example, polycaprolactam and various kinds of polyamide (nylon). Other examples of Resin B include aromatic polyesters such as polyethylene terephthalate, polybutylene terephthalate, etc. Resin B is mixed as a dispersant resin with the matrix Resin A.

The biodisintegrable thermoplastic resin moldings of the present invention are distinguished by their special structure that Resin A constitutes a matrix and Resin B is uniformly dispersed therein so that Resin B is at all times covered with the biodisintegrable Resin A. As the biodisintegrable Resin A always exists on the superficial part of the resin moldings, the initial biodisintegration by microorganisms is remarkably good. After disintegration of the superficial part of the moldings by microorganisms, the newly exposed surface of the moldings also constitutes Resin A. Accordingly, the resin moldings as a whole show excellent biodisintegrability even if the moldings contain Resin B devoid of biodisintegrability.

The biodisintegrable thermoplastic resin moldings of this invention can be produced according to the process wherein a melt-kneaded mixture of the above Resins A and B in a specific proportion in an extruder is extruded through a die positioned at the front end of the extruder under the conditions satisfying the expressions (I) and (II) to a low pressure zone. Any type of the ordinary extruder can be used for this purpose.

The extrusion conditions represented by the above expressions (I) and (II) can be achieved by using Resin A having a suitable molecular weight in conjunction with Resin B having a suitable molecular weight or by properly selecting a proportion of plural Resins A and a proportion of plural Resins B if a mixture of Resin A and a mixture of Resins B are used.

In the resin moldings of the present invention, the amount of Resin A used is 25-60 weight %, preferably 30-50 weight % and the amount of Resin B used is 75-40 weight %, preferably 70-50 weight %. As the disintegration of the moldings of this invention is caused by chemical decomposition of Resin A by microorganisms, the disintegration of the moldings is promoted by increasing the proportion of Resin A to the whole resin. If the amount of Resin A exceeds the above range, however, the mechanical properties of the resultant moldings will be deteriorated to be not practical. On the other hand, if the amount of Resin A is less than the above range, the moldings wherein Resin A constitutes a matrix resin will be not obtained even if the value $\eta_B/\eta_A$ is increased. The moldings obtained in this case are inferior in biodegradation. If the viscosity of Resin A is less than 500 poise at the extrusion temperature, the proportion of moldings being extrusion will become difficult. If the value $\eta_B/\eta_A$ is 10 or more, the difference in viscosity between Resin A and Resin B will become too great to be convenient in mixing both resins. On the other hand, if the value $\eta_B/\eta_A$ is less than 1, the moldings wherein Resin A constitutes a matrix resin will not be obtained as mentioned above. Accordingly, the proportion of Resin A to Resin B and the viscosities of both resins at the extrusion temperature are specifically limited.

The moldings of this invention may be incorporated with other auxiliary substance or substances. For example, the moldings may be incorporated with an inorganic filler to enhance the mechanical strength of the moldings or with a compatibilizer to enhance miscibility of Resin A with Resin B. Illustrative of the inorganic filler are, for example, talc, calcium carbonate, magnesium carbonate, clay, silicic acid, carbon black and gypsum. Example of the compatibilizer include a copolymer of Resin A and Resin B and a polymer wherein functional groups have been introduced by great polymerization into Resin B. In case such compatibilizer is used, it is handled equivalently to Resin B so that its viscosity at the extrusion temperature C should also satisfy the equation:

$$10 > \eta_C/\eta_A \geq 1.$$

Further, the amount of such compatibilizer is calculated as a part of the Resin B. If necessary, the moldings may further be incorporated with a plasticizer and/or a colorant according to the intended use.

According to the above process using an extruder, the moldings of the present invention can be obtained in any desired shape, such as a film, sheet plate, thread, net and pellets. In case an injection moldings method wherein a metal die is mounted to the front end of an extruder is adopted for the production of the moldings, it is also possible to produce the moldings in any desired form of three dimensionally large size such as a container or tray. These moldings may be foamy or solid (non-foamy) articles. It is usually determined according to the desired purpose whether foamy moldings are to be manufactured or solid moldings are to be manufactured. In case foamy moldings are produced, a known conventional foaming step is added to the above process for producing the moldings or at the separate stage the moldings have been produced. Among the above mentioned various moldings, those in the form of pellets can especially be foamed in a known conventional method at a later stage to form foamed particles which may then be molded in a mold to form articles in various forms such as cushining materials or containers. The moldings in the form of a film, sheet or plate can be shaped by a secondary processing into various articles such as a bag, bowl, tray, lunch box and cushining materials.

The biodisintegrable thermoplastic resin moldings of the present invention are easily disintegrated after disposal in an environment where microorganisms exist so that the moldings can significantly be reduced in their bulkness. Therefore, the present invention affords an effective means for solving problems of treating disposed plastic materials. Even if the moldings are left in natural environment after disposal without recovery, they are easily disintegrated by microorganisms and retain no toxic substance so that the moldings give no harmful effect on the life of natural plants and animals. The moldings of this invention are usually used in the form of a sheet, film, thread, plate, container or the like.

In particular, the moldings in the form of a film can be used for forming a cushining material having a multiplicity of air-tight cells between embossed laminatd films. Such cushining material can easily be attacked after disposal by microorganisms whereby the independent hollow cells are opened to form a communicating intercellular structure. Accordingly, the moldings can be reduced in its bulkness. In case such cushining material is disposed on reclaimed land, the material is rapidly reduced in its bulkness and effectively serves to make the ground firm.

The present invention will now be illustrated in more detail by way of examples and comparative examples.

EXAMPLES 1-3, COMPARATIVE EXAMPLE 1-3:

A low density polyethylene (B) having a $\eta_B$ of 6,000 to 12,000 poise and a polycaprolactone (A) having a $\eta_A$ of 4,000 poise at an extrusion temperature of 165° C. were melt-kneaded in a proportion as shown in Table 1 and the melt-kneaded mixture was extruded from an inflation film-producing machine having a die of 100 mm in diameter whereby a film having a thickness of about 100 μm was obtained. The resultant film was examined for its biodisintegrability and tensile strength. The measurement of biodisintegrability in this case was conducted according to the following method: In a 100 ml Erlenmayer flask were placed 0.3 ml of a lipase solution having a factor capable of producing 130 μmol of fatty acids in one minute from olive oil, 2 ml of a phosphate cushining solution (pH 7), 1 ml of a surfactant (trade name "Plysurf A210G", Daiichi Kogyo Seiyaku KK, Japan), 16.7 ml of water and a sample [the amount of polycaprolactone (A) is always 100 mg in each sample having a different proportion]. The mixture was then reacted together for 16 hours at 30° C. and the total organic matter formed after completion of the reaction was measured as total organic carbon(monomer and/or oligomer constituting polycaprolactone). As a control test, the experiment was carried out in the same manner as described above except that the lipase solution was not used, and the measured values were corrected on the control test.

The measurement of tensile strength was conducted in such manner that pieces in the form of a strip of 100 mm × 10 mm were prepared and examined by means of a tensile strength tester at a distance between chucks of 50 mm and at an elongation velocity of 50 mm/min. The measurement of the viscosities ($\eta_A$ and $\eta_B$) as described above was carried out by using a Shimazu's Flow Tester Model CFT-500 A (Shimazu Mfg. Co., Japan).

A result of the tests is shown in Table 1. As it is evident from Table 1, the thermoplastic resin moldings of the present invention exhibit excellent biodisintegrability and tensile strength. In contrast to this, the moldings wherein the amount of Resin A is too small (Comparative Example 2) are excellent in tensile strength but are inferior in biodisintegrability. In case of the moldings wherein the amount of Resin A is too excessive (Comparative Example 3) are excellent in biodisintegrability but are inferior in tensile strength, thus lacking in practical value.

COMPARATIVE EXAMPLE 4-6:

In case of obtaining moldings under extruding conditions satisfying the formula: $\eta_A/\eta_A > 10$ by using the resins in the same proportion as in Example 3 except that polyethylene having a viscosity ($\eta_B$) of 44,000 at 165° C. (Comparative Example 4) was used as Resin B, the difference in viscosity between the resins was so large that it was impossible to make the processing of the resins to a film. In case of the viscosity being $\eta_B/\eta_A < 1$ in the same situation as in Example 3 except that polyethylene having a viscosity ($\eta_B$) at 165° C. of 3200 was used (Comparative Example 5), the resultant moldings in the form of a film was satisfactory in tensile strength but was deteriorated in biodisintegrability. In case of elevating the extrusion temperature to make the viscosity to $\eta_A < 500$ in the same situation as in Example 3 except that polyethylene having a viscosity ($\eta_B$) at 165° C. of 14000 was used and that polycaprolactone having a viscosity ($\eta_A$ of 3000 was used (Comparative Example 6), the viscosity of the resins was too low to make processing of the resins to a film.

EXAMPLES 4-5, COMPARATIVE EXAMPLES 7-8:

A film was produced in the same manner as described in Examples 1-3 except that a polystyrene having a viscosity ($\eta_B$) of 3,000 poise or 14,000 poise was used. The resultant film was also examined for its biodisintegrability and tensile strength. A result of the examinations is shown in Table 1. As is evident from the result, the moldings of the present invention exhibit excellent biodisintegrability and tensile strength. Contrary to this, the case of the proportion of Resin A being too small (Comparative Example 7) shows good tensile strength but poor biodisintegrability. In case of using an extrusion condition of $\eta_B/\eta_A > 10$ for obtaining resin moldings (Comparative Example 8), the melt-kneaded resins were not proposed to a film.

TABLE 1

| | Proportion | | Extrusion Condition | | | Properties of Film | | | |
| | | | | | | Thickness | Biodisintegrability | | Tensile |
| | A (wt %) | B (wt %) | $\eta_A$ (poise) | $\eta_B$ (poise) | $\eta_B/\eta_A$ | (μm) | Organic Substances (ppm) | Against Resin A alone (%) | Strength (kgf/mm$^2$) |
| Example | | | | | | | | | |

TABLE 1-continued

| | Proportion | | Extrusion Condition | | | | Properties of Film | | |
|---|---|---|---|---|---|---|---|---|---|
| | | | | | | | | Biodisintegrability | |
| | A (wt %) | B (wt %) | η$_A$ (poise) | η$_B$ (poise) | η$_B$/η$_A$ | Thickness (μm) | Organic Substances (ppm) | Against Resin A alone (%) | Tensile Strength (kgf/mm²) |
| 1 | 55 | 45 | 4000 | 6000 | 1.5 | 100 | 550 | 95 | 1.20 |
| 2 | 45 | 55 | 4000 | 8000 | 2 | 100 | 370 | 64 | 1.30 |
| 3 | 35 | 65 | 4000 | 12000 | 3 | 100 | 140 | 24 | 1.35 |
| 4 | 50 | 50 | 3000 | 3000 | 1 | 100 | 210 | 36 | 3.6 |
| 5 | 35 | 65 | 3000 | 14000 | 4.7 | 100 | 70 | 12 | 4.7 |
| Comparative Example | | | | | | | | | |
| 1 | 100 | 0 | 4000 | | | 100 | 580 | 100 | |
| 2 | 15 | 85 | 4000 | 8000 | 2 | 100 | 20 | 3.4 | 1.40 |
| 3 | 65 | 35 | 4000 | 6000 | 1.5 | 100 | 570 | 98 | 0.95 |
| 4 | 35 | 65 | 4000 | 44000 | 11 | | | | |
| 5 | 35 | 65 | 4000 | 3200 | 0.8 | 100 | 35 | 6.0 | 1.35 |
| 6 | 35 | 65 | 400 | 3600 | 9 | | | | |
| 7 | 15 | 85 | 3000 | 14000 | 4.7 | 100 | 15 | 2.6 | 5.0 |
| 8 | 35 | 65 | 700 | 14000 | 2.0 | | | | |

EXAMPLES 6 and 7, COMPARATIVE EXAMPLE 9:

Two films of about 50 um in thickness were obtained by melt-kneading the resins in the same proportion as described in Examples 1 and 2 and in Comparative Example 2 (as shown in Table 2 below) and extruding the kneaded resins through two T dies (width: 700 mm), respectively. The resultant films were then subjected to embossing and laminating treatment by the aid of an apparatus for manufacturing bubble films Model ABM-600 (Hagino Kiko KK, Japan) whereby laminated cushining materials were obtained which had about 8550 air-tight cells about 4 mm in height and 10 mm in diameter per square meter. The resultant laminated cushining material was then examined for biodisintegrability in the following manner: First of all, 20 sheet samples (100×100 mm, the number of effective air-tight cells: 72) were prepared from the same laminated cushining material and piled up in a container 100 mm in length, 100 mm in width and 150 mm in height. A 2 kg weight in the form of a plate (95 mm in length and 95 mm in width) was put on the pile of the samples and the height T(A) of the 20 sheet samples was measured and recorded.

Separately, 3 ml of a lipase solution having a factor capable of producing 130 μmol of fatty acids in one minute from olive oil, 20 ml of a phosphate cushining solution (ph 7), 10 ml of a surfactant (Plysurf A210G as described above) and 167 ml of water were placed in each of the twenty 500 ml beakers. Each sample was placed in each beaker, and the mixture in the beaker was reacted together for 48 hours at 30 ° C. After completion of the reaction, each sample was taken out form the beaker and dried. The 20 sheet samples thus treated were piled up in the container and the 2 kg weight was put on the pile of the samples in the same manner as above to measure the height T(B) of the samples. From a result of the measurement, the biodisintegrability (R) of the samples was calculated according to the following equation:

$$R = [T(A) - T(B)]/T(A) \times 100 \ (\%)$$

A result of the calculation is shown in Table 2.

As is evident from the result of Table 2, the cushining material of the present invention exhibits excellent biodisintegrability as the air-tight sells are collapsed by disintegration to decrease the height, i.e. bulkness of the material rapidly. Contrary to this, the sample of Comparative Example 9 wherein the proportion of Resin A is too small did not cause collapse of the air-tight cells so that the height was not decreased.

TABLE 2

| | Proportion | | Viscosity of Extrusion (165° C.) | | | Biodisintegrability R (%) |
|---|---|---|---|---|---|---|
| | A (wt %) | B (wt %) | η$_A$ (poise) | η$_B$ (poise) | η$_B$/η$_A$ | |
| 6* | 55 | 45 | 4000 | 6000 | 1.5 | 72 |
| 7* | 45 | 55 | 4000 | 8000 | 2 | 65 |
| 9** | 15 | 85 | 4000 | 8000 | 2 | 3 |

*Examples
**Comparative Example

It is understood that the preceding representative examples may be varied within the scope of the present specification both as to ingredients and treatment conditions, by one skilled in the art to achieve essentially the same results.

As many widely, different embodiments of this invention may be made without departing from the spirit and scope thereof, it is to be construed that this invention is not limited to the specific embodiment thereof except as defined in the appended claims.

What is claimed is:

1. A process for producing biodisintegrable thermoplastic resin moldings which comprises extruding a melt-kneaded mixture of 25–60 weight % of an aliphatic polyester resin A and 75–40 weight % of another type of thermoplastic resin B through a die positioned at the front end of the extruder under the condition satisfying the following expressions:

$$10 > \eta_B/\eta_A \geq 1, \quad (I)$$

$$\eta_A \geq 500 \quad (II)$$

wherein $\eta_A$ stands for the viscosity in terms of poise of the aliphatic polyester resin at the extrusion temperature, and $\eta_B$ stands for the viscosity in terms of poise of said another type of thermoplastic resin at the extrusion temperature, whereby said polyester resin forms a continuous phase with said another resin dispersed as a discontinuous phase therein, wherein said aliphatic polyester resin A is selected from the group consisting of polycondensates of an aliphatic polycarboxylic acid with an aliphatic polyhydric alcohol, polycondensates of an aliphatic hydroxycarboxylic acid and ring-opened polycondensates of a lactone, and wherein thermoplastic resin B is selected from the group consisting of homopolymers and copolymers of olefins, styrenes, vinyl compounds, acrylic compounds, lactams, and combinations of polycarboxylic acids and polyamines.

2. A process in accordance with claim 1 wherein the viscosities $\eta_A$ and $\eta_B$ satisfy the following expression:

$$5 > \eta_B/\eta_A \geq 1.$$

3. A process in accordance with claim 1 wherein said resin A is biodisintegrable and said resin B has no biodisintegrability and wherein said melt-kneaded mixture comprises 30–39 weight % resin A and 51–70 weight % resin B.

* * * * *

UNITED STATES PATENT AND TRADEMARK OFFICE
CERTIFICATE OF CORRECTION

PATENT NO. : 5,225,490
DATED : July 6, 1993
INVENTOR(S) : TOKIWA et al

It is certified that error appears in the above-indentified patent and that said Letters Patent is hereby corrected as shown below:

Col. 6, line 25, "$\eta_A/$" should read --$\eta_B/$--.

Col. 8, the fourth line under the heading "Tensile Strength $(kgf/mm^2)$", "3.6" should read --3.5--.

Col. 10, line 9, "39" should read --49--.

Signed and Sealed this

Nineteenth Day of April, 1994

Attest:

BRUCE LEHMAN

*Attesting Officer*   *Commissioner of Patents and Trademarks*